Nov. 26, 1963 W. E. HOCH 3,112,012
CRANKCASE DRAINING UNIT
Filed March 23, 1960 3 Sheets-Sheet 1

Inventor
Woodrow E. Hoch
By Merriam, Smith & Marshall
Attorneys

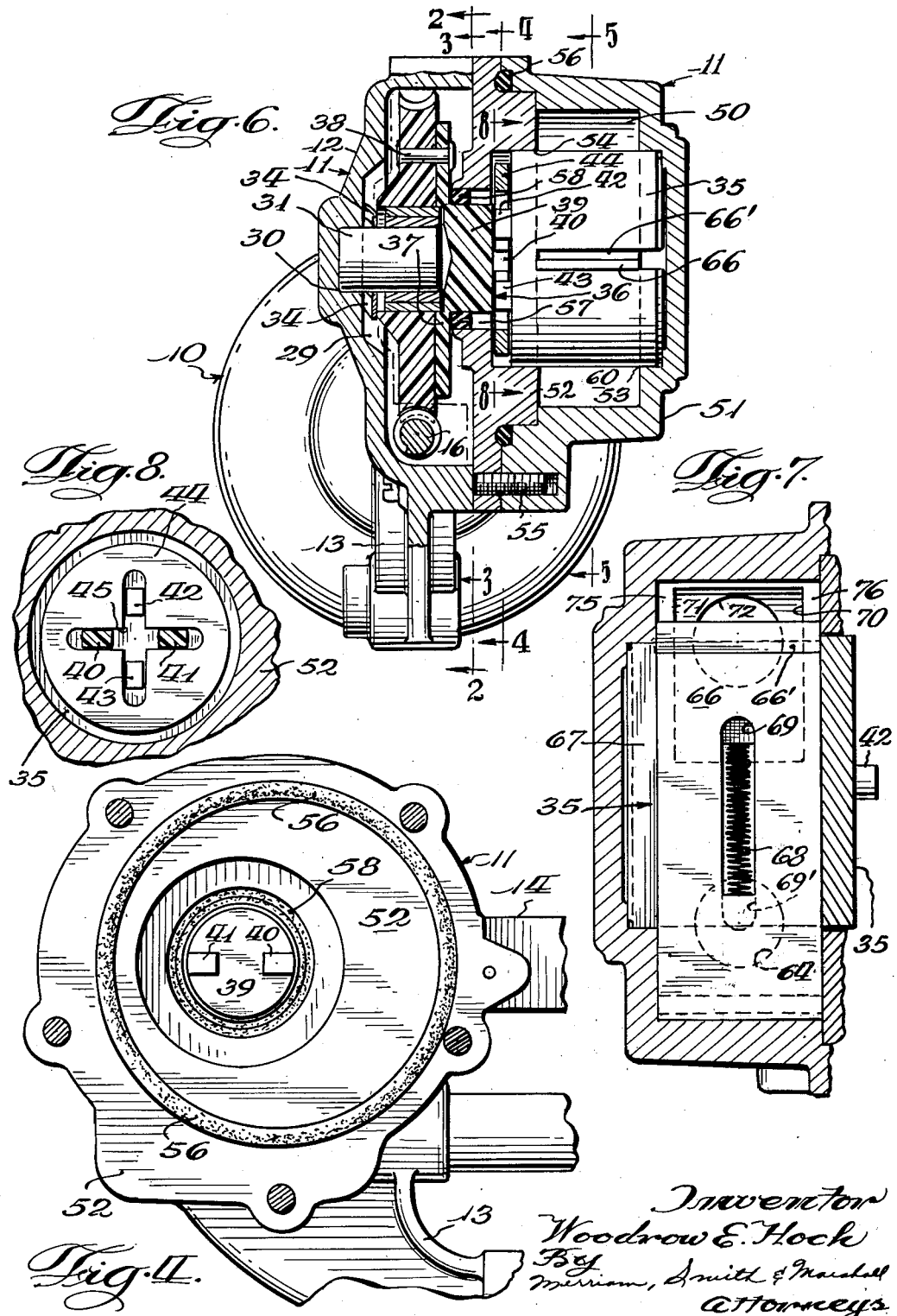

Nov. 26, 1963 W. E. HOCH 3,112,012
CRANKCASE DRAINING UNIT
Filed March 23, 1960 3 Sheets-Sheet 3

Inventor
Woodrow E. Hoch
By Merriam, Smith & Marshall
Attorneys

United States Patent Office 3,112,012
Patented Nov. 26, 1963

3,112,012
CRANKCASE DRAINING UNIT
Woodrow E. Hoch, 1320 Westmoor, Winnetka, Ill.
Filed Mar. 23, 1960, Ser. No. 17,093
7 Claims. (Cl. 184—1.5)

This invention relates to a rotary vane displacement pump. It is especially directed to a drainage unit for the rapid, mechanical draining of lubricating and industrial oils contained in oil sumps.

In using various types of lubricating and industrial oils, the oil is stored or located in a suitable oil sump from which it is pumped for use or into which the mechanical equipment is dipped for proper lubrication thereof. Usually, the sumps are placed in locations on the equipment which makes the draining of the oil therefrom a difficult and sometimes dangerous operation. For example, in the draining of lubricating oil from automotive crankcases, it is desirable that the engine be operated for a time previous to the drainage in order that the lubricating oil can be heated and thereby made less viscous. In the removal of the oil from the crankcase, it is necessary to elevate the automobile to a position so that the service station attendant or mechanic can have ready access to the crankcase drain plug. Frequently in the removal of the drain plug, the hot oil is splashed on the attendant and serious burns can occur. In other installations, the crankcase or oil sump is not conveniently located and it is sometimes necessary to dismantle portions of the equipment in order to have ready access to the oil sump.

Becaues the problem of draining automotive crankcases or other types of oil sumps is burdensome, various techniques have been employed for removing the oil from the oil sumps. For example, in the case of automotive crankcases, pumping equipment has been designed wherein the inlet tube of the pump is inserted through the oil level dip-stick hole into the crankcase in order that the oil can be pumped therefrom. This is not a satisfactory arrangement because the dip-stick holes are small and in certain types of engines have a tortuous path through which it is difficult to pass the inlet tube of the pumping unit. On other types of equiment, the sump may be so positioned that it is difficult to insert an inlet tube into the sump tank for the removal of the oil. In addition, in certain types of equipment, such as automotive vehicles, during the period between crankcase draining, the oil is subjected to operating conditions whereby sludge in the form of solid carbonaceous particles, sand, metal abrasions and the like occur in the lubricating oil. Because the crankcase is in a substantially static condition during the draining of the oil therefrom, the sludge particles precipitate to the bottom of the crankcase and remain there, so that even though upon refilling the crankcase with fresh oil, the sludge particles are still present within the crankcase.

According to this invention, there is provided an oil sump drainage unit employing the rotary vane displacement pump. The rotary pump is constructed so that the operation of the pump not only will pump the oil from the sump but will also induce vibrations during the pumping cycle which are transmitted to the oil sump by means of a substantially rigid conduit interconnecting the inlet side of the pump and the oil sump. The vibration induced by the operation of the pump produces a mixing action in the oil pool such that the sludge particles are agitated and suspended within the oil during the draining period thereby facilitataing the removal of the sludge particles. In addition, the rotary pump is provided with a depressed area around outlet port which permits the sludge particles received into the pump chamber to be readily swept therefrom by the impelling action of the pump. This prevents sludge particles from being retained in the pump chamber and causing the jamming of the impeller vane assembly. The depressed area also functions as a reservoir to retain a small amount of oil during periods of pumping inactivity. Thus, the oil remaining insures the positive priming of the pump during the next pumping cycle.

Referring to the drawings, FIGURE 1 illustrates a typical installation of the oil sump drainage unit of this invention installed in the engine compartment of an automotive vehicle for the purpose of facilitating drainage of the engine crankcase. An electrical interlock system is schematically shown which prevents operation of the drainage unit while the engine is operating or the crankcase is substantially empty.

FIGURE 2 is a cross-sectional side view of a specific embodiment of the oil sump drainage unit of this invention taken along line 2—2 of FIGURE 6 with the electric drive motor being shown in a fragmentary view and with the cover plate enclosing the gear housing and the pinion drive gear removed Breakaway views of the pump housing illustrate the mounting of the worm gear within the pump housing and its connection to the motor.

FIGURE 4 is a fragmentary cross-sectional view taken along line 4—4 of FIGURE 6 showing the pump casing with the pump housing cover and pump impeller removed.

FIGURE 6 is a fragmentary transverse cross-sectional end view of the oil sump drainage unit.

FIGURE 7 is an enlarged fragmentary cross-sectional view taken along line 7—7 in FIGURE 5 of the impeller hub and vane assembly employed in the drainage unit.

FIGURE 8 is an enlarged fragmentary view taken along line 8—8 in FIGURE 6 showing an illustrative coupling means for interconnecting the pinion drive gear with the impeller hub of the oil sump drainage unit.

Figures 1, 5:
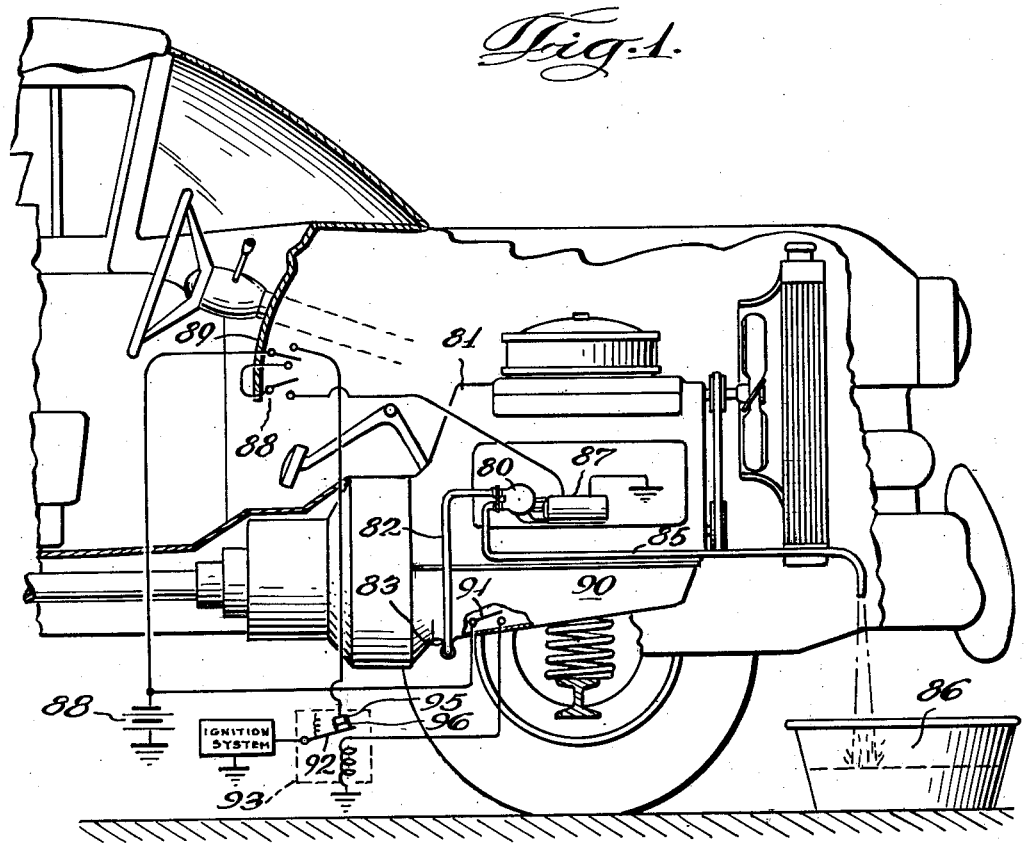
FIGURE 5 is a cross-sectional side view of the pump assembly of this invention taken along line 5—5 of FIGURE 6 showing the position inlet and outlet lines of the drainage unit in relationship to the pump chamber and impeller hub.

In the oil sump drainage unit of this invention a rotary vane displacement pump employing a single pair of opposed impeller vanes mounted in side-by-side relationship in a slotted impeller hub are employed as the pumping elements of the subject drainage unit. The impeller vanes are biased outwardly from each other into contact with the side wall of the pump chamber. A suitable drive means is employed to effect the rotation of the pump impeller within the pump chamber to produce a pumping action. In the rotary vane displacement pump, the impeller hub is in tangential contact with the side wall of the pump chamber at the so-called null point to produce a lunate pump chamber. In order to induce the desired vibratory effect by the action of the pump, the inlet port of the pump chamber is angularly displaced from the point of tangential contact or null point between the pump chamber side wall and the impeller hub. This displacement produces a surge mistiming of the pump cycle which is quantitatively determined by the amount of vacuum produced by the impeller vane travelling from the point of tangential contact to the point of opening of the inlet port. On the outlet side of the pump, there is provided a depressed area adjacent the outlet port into which any sludge particles pumped from the oil sump can be swept and removed from the pump chamber by the flushing action of the pumped oil. This prevents any sludge particles from being retained in the pump chamber which would cause jamming of the impeller hub and prevent its rotation. The depressed area also permits the pump to self prime by retaining a small amount of oil therein.

Referring to the drawings, it will be seen that the specific embodiment of the oil sump drainage unit of this invention drawn to double scale comprises an electrical motor 10, to which is integrally connected the pump component 11 of the drainage unit. The pump component comprises a gear housing 12 upon which are integrally mounted brackets 13 and 14 laterally extending therefrom in order to permit attachment of the drainage unit to the housing 15 of electrical motor 10. The gear housing 12 also serves as a support means for worm gear 16 which is journaled within pump housing 12 by means of suitable bearings 17 and 18 which are installed into opposed openings 19 and 20 provided in the pump housing 12. Worm gear 16 is connected to drive shaft 17 of electrical motor 10 by means of a suitable coupling 21. As shown a D-shaped slot 21 is provided in the coupling 21 which engages the similarly shaped terminal end of shaft 17. A cap 22 is employed to enclose bearing opening 19 in order to keep out dust, dirt and the like. Interposed between one terminal end of shaft 23 of worm gear 16 and cap 22 is a ball bearing 24 which functions as a thrust bearing when the drainage unit is operated with the worm gear in a vertical position. The other shaft 25 of worm gear 16 is also protected from dust, dirt and the like by means of a tubular enclosure 26 which coaxially extends between electrical motor housing 15 and gear housing 12. The end of tubular enclosure 26 seats within a groove 27 provided by bearing 18 and opening 20. A further seal of this joint is effected by means of an O-ring 28 which surrounds the joint between gear housing 12 and tubular enclosure 26 and fits into a suitable annular groove provided in the surrounding wall of gear housing 12.

Figure 2:
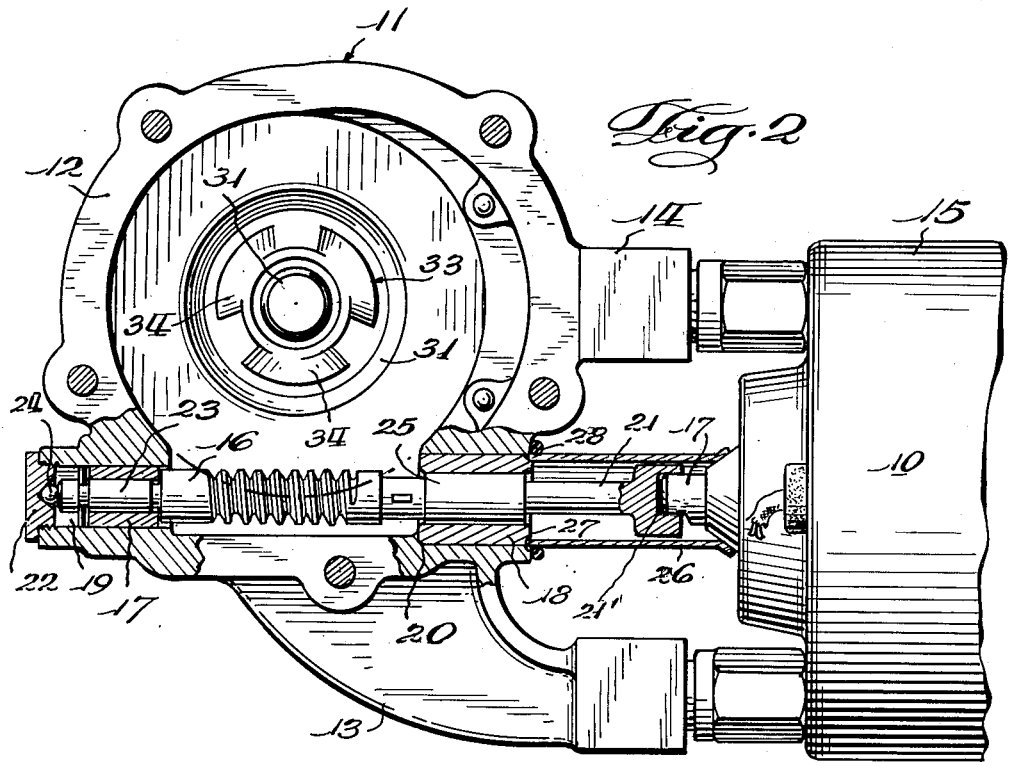
Figure 3:
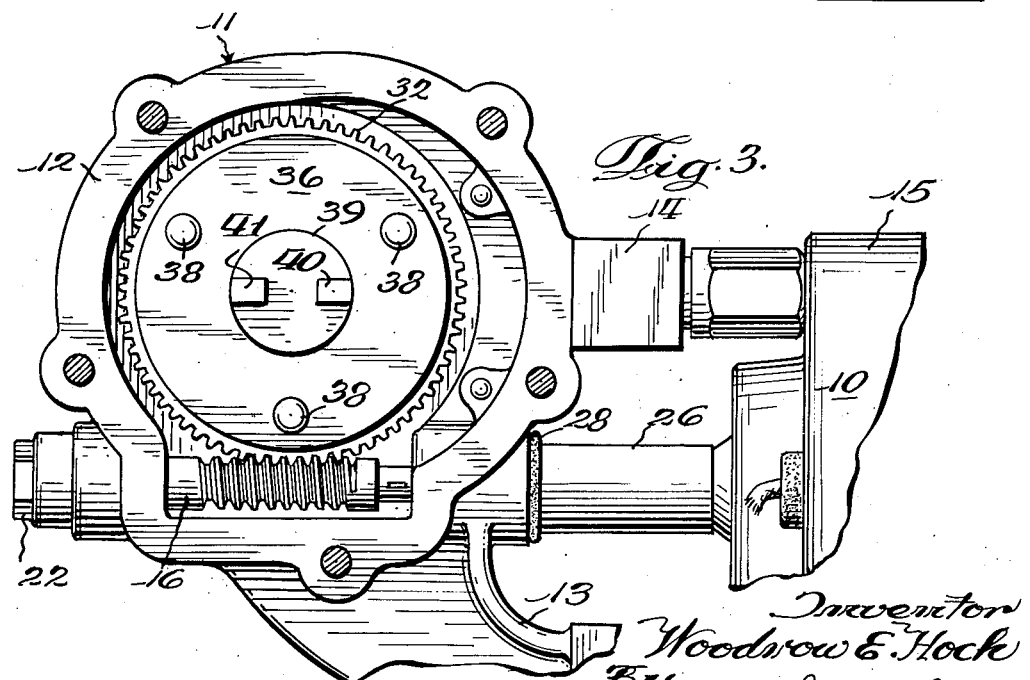
FIGURE 3 is a fragmentary view similar to that of FIGURE 2 taken along line 3—3 of FIGURE 6, showing the pump casing with the gear housing cover removed and showing pinion drive gear in place.

Referring to FIGURE 6, it will be noted that the outer face of gear housing 12 is provided with a concavity 29 which surrounds circular pocket 30 which is employed as a bearing surface for shaft 31 of the pinion drive gear 32. Fitted within cavity 29 and surrounding shaft 31 is a spring washer 33 which comprises as shown in FIGURE 2 a plurality of oblique radial faces 34 which bear against the outer face of pinion drive gear 32 and urge it into interconnection with impeller hub 35, as will be hereinafter discussed.

Worm gear 16 and pinion drive gear 32 form a speed reduction drive for driving impeller hub 35 at a suitable speed by means of electrical motor 10 which normally will rotate at a speed in excess of the desired speed of rotation of the pump unit. Pinion drive gear 32 is coupled to impeller hub 35 by means of a coupling flange 36 comprising an annular flange 37 secured to the interface of pinion drive gear 32 by suitable fastening means 38. Integral with flange 37 is a circular boss 39 which has mounted on the outer face thereof a pair of diametrically opposed teeth 40 and 41. Similarly, impeller hub 35 has on the inner face thereof adjacent the face of circular boss 39 a pair of diametrically opposed teeth 42 and 43.

To couple impeller hub 35 to circular boss 39, a coupling washer 44, having disposed in the face thereof a cruciform slot 45 is utilized. The teeth 40 and 41 on the face of circular boss 39 are displaced 90° with respect to the teeth 42 and 43 on the face of impeller hub 35. In this position, the teeth will register with the cruciform slot 45 provided in coupling washer 44. This type of coupling is employed in the illustrative embodiment in order to compensate for any minor misalignments which might occur during the manufacture of the pumping unit and affect the exact coaxial alignment of pinion drive gear 32 and impeller hub 35.

Impeller hub 35 is disposed within lunate pump chamber 50 which is formed by means of pump chamber cover 51 and intermediate plate 52 which separates pump chamber 50 from the gear housing 12. Impeller hub 35 is journaled in suitable circular pockets 53 and 54 provided respectively in the faces of the pump chamber cover 51 and intermediate plate 52 which face inwardly toward pump chamber 50. Circular pocket 54 is made sufficiently deep so that coupling washer 44 can be sandwiched therein to couple impeller hub 35 with circular boss 39.

It will be noted from FIGURE 6 that gear housing 12, intermediate plate 52 and pump chamber cover 51 are integrated into a unitary assembly by means of machine screws 55 which penetrate holes provided in gear housing 12 and intermediate plate 52 and threadably engage with pump chamber cover 51 to provide a fluid-tight seal for pump chamber 50. O-ring 56 is employed in cooperation with suitable grooves positioned in mating faces of intermediate plate 52 and pump chamber cover 51, to provide a fluid-tight pump chamber. The inner hole 57 provided in intermediate plate 52 through which circular boss 39 extends is made fluid-tight by means of a conventional oil seal 58 which cooperates with the side wall of hole 57 and circular boss 39.

The pumping element positioned in pump chamber 50 comprises two opposed impeller vanes 66 and 66' mounted in side-by-side relationship within a diametrical slot 67 provided in impeller hub 35. The impeller vanes 66 and 66' are biased outwardly and urged into abutment with the side wall of pump chamber 50 by means of compression coil spring 68 which is mounted within the common slot formed by the cooperating elongated slots 69 and 69' provided respectively in impeller vanes 66 and 66'. In FIGURE 7, it will be seen that impeller vanes 66 and 66' are identically formed with slots 69 and 69' being closer to one end of the vane than the other. Thus, when the impeller vanes 66 and 66' are placed in an opposed position, the resulting common slot which holds coiled compression spring 68 can be changed in length from a length equivalent to the length of one of the slots in the impeller vanes or smaller. Thus, with compression coil spring 68, which is longer than the impeller slot, engaging the opposed edges of slots 69 and 69', the impeller vanes 66 and 66' are urged outwardly against the side wall of pump chamber 50. In the illustrated embodiment, the pumping efficiency of the pump is enhanced by providing a coil spring which causes the impeller vanes to exert a 1½–3½ pounds force against the sidewall of the pump chamber. During the course of the rotation of impeller vanes 66 and 66' over the depressed area 70 surrounding the outlet port 71, they are retained in correct orbit by the portions 75 and 76 of the side wall which surrounds depressed area 70.

In order to effectuate the objectives of this invention, impeller hub 35 is eccentrically mounted in pump chamber 50 in tangential contact with the side wall 60 of pump chamber 50 as shown in FIGURE 5 such that a substantially fluid-tight barrier is provided at this null point. In order to produce the desired mistiming of the pumping cycle, inlet port 61 is angularly displaced from the point of tangential contact to produce a surge area 62 which, during the operation of the pump, produces pulsations which are transmitted through the substantially rigid conduit employed as the inlet line 63 connected to the pump inlet 64 by means of a conventional tubing coupling means 65. In the illustrated embodiment the angular displacement is 32°. Generally an angular displacement of 25°–40° is used; however, angles outside this range can be used. During the operation of the pump, as the impeller vane 66 passes the point of tangential contact and traverses the surge area 62, there is produced a sub-atmospheric pressure within this area. When the inlet port 61 is opened by impeller vane 66 passing the edge of inlet port 61 adjacent the surge area 62, the sub-atmospheric pressure is instantaneously increased to the pressure existing in the inlet 64 of the pumping unit. This produces a resulting surge or pulse which, when produced at the frequency of rotation of the pump, causes a vibrational energy wave. The energy produced when transmitted to the sump by a suitable means such as a rigid conduit is sufficient to maintain the oil within the sump in a state of agitation and minimize the settling of sludge particles during the draining of the oil from the sump. Any sludge particles which are carried through inlet 64 into pump chamber 50 are swept out of pump chamber 50 by impeller vane 66 in cooperation with the depressed area 70 surrounding outlet port 71 which communicates with pump outlet 72. A suitable discharge line 73 is connected to outlet 72 by a coupling means 74, as shown. Accordingly, the depressed area surrounding outlet port 71 prevents any solid sludge particles from being trapped in pump chamber 50 and driven into the point of tangential contact between the impeller hub 35 and the pump chamber cover 51 which would result in the jamming of the impeller hub 35 and prevent its free rotation. This area also acts as an oil reservoir and during periods when the pump is not functioning will hold enough oil to insure the self priming of the pump upon restarting. To obtain this desired effect the pump unit should be so positioned to avoid the complete gravity drainage of the residual oil from this area.

An illustrative application of the sump drainage unit of this invention as installed on an automotive vehicle is schematically shown in FIGURE 7. In this instance, the sump drainage unit 80 is mounted on the motor block of engine 81 by suitable brackets. The inlet line 82 is a substantially rigid conduit connected to the outlet 83 of crankcase 84. Preferably a T-fitting is employed with the side outlet thereof being connected to the outlet 83 in crankcase 84. A removable plug (not shown) is fitted at one end of the run of the T-fitting. The other end of the run is connected directly to inlet line 82. Outlet line 85, which can be any suitable rigid or non-rigid tubing or conduit, is led to a suitable position on the automobile chassis under which a container 86 can be placed and into which the drained oil can be discharged. The electrical motor 87 used to power the drainage unit 80 is connected to the car battery 88 by suitable electrical leads and the pump 80 is energized by means of a key-operated switch 88 (shown schematically) located on the dashboard in the operator's compartment of the automobile. To avoid operating the pump 80 while the automobile engine is operating or the car is being driven, or conversely to prevent the engine from being operated with inadequate oil supply in the crankcase, an electrical interlock system shown schematically in FIGURE 1 can be used. Thus, to operate the pump 80, switch 88 is connected in series with the so-called "off" side of a conventional automotive ignition switch 89. Accordingly, when switch 89 is in the position which energizes the accessory automotive electrical circuit without energizing the ignition circuit switch 88 can be used to operate motor 87, and thereby automatically drain the oil from the crankcase 90. Thereafter, the crankcase can be refilled with fresh oil by poring the oil through the crankcase fill tube in the conventional manner. If desired, the electrical motor 87 can be made reversible and means provided for pumping oil from a suitable container through line 85 and into the crankcase 90. The other phase of the electrical interlock system will prevent the automobile engine from being started while the crankcase is empty, by installing a suitable pressure-sensitive switch 91 in the crankcase 90 adjacent the lowest portion thereof. This switch 91 is sensitive to liquid level and will be designed to be in the closed position when the liquid level within the crankcase 90 has lowered during the course of the oil draining.

Upon opening switch 91, the normally closed armature 92 of relay 93 will interrupt the electrical continuity of the ignition circuit 94 by the separation of electrical contacts 95 and 96. As a result of the opening of contacts 95 and 96, ignition switch 89 will be inoperative and will thereby prevent the engine from being started while the oil level in crankcase 90 is at a low level.

Conventional materials of construction are used in fabricating the drainage unit components. The various parts of the housing can be die-cast from aluminum. The impeller can be made by powdered metallurgy techniques or conventional machining operations. Preferably the impeller vanes are made from laminate plastics such as melamine or phenol-formaldehyde laminates employing a linen base. The pumping unit can be driven by prime movers other than the electrical motor as shown. If an electrical motor is employed, a fractional horse power A.C. or D.C. motor is utilized. For example, in one specific embodiment of a sump drainage unit manufactured in accordance with this invention, a D.C. series motor having $\frac{1}{20}$ H.P. was employed. This motor was designed to operate with a no-load rotation of 15,000 r.p.m. employing a 12-volt D.C. source of power. While pumping, the motor rotates at 10,000 r.p.m., and will draw 2.5 to 3.5 amps. In employing this motor, a speed reduction unit was employed which provided a 72:1 reduction. Accordingly, the pump unit operated at a speed of 140–150 r.p.m. The capacity of the pump should be selected so that the drainage of the sump can be carried out within a short period of time. For example, in some drainage units employed for automotive use, it is preferable to employ a pump capacity of one liquid gallon per minute so that the oil drainage can be carried out within a short period of time. In the event that other prime movers are available as part of the equipment upon which the sump drainage unit of this invention is used, the pump can be coupled by conventional mechanical means thereto in order to eliminate the integral electric motor as shown.

This application is a continuation-in-part of application Serial No. 818,181, filed June 4, 1959, by Woodrow E. Hoch, now abandoned.

Although the subject invention has been described with reference to the aforementioned specific embodiment, it is apparent that variations and modifications can be made by those skilled in the art without departing from the scope of the invention. Accordingly, it is intended that the subject invention be limited only by the spirit of the invention as defined in the appended claims.

What is claimed is:

1. A non-variable, rotary displacement pump for lubricating and industrial oil drainage units which comprises a pump casing having a substantially circular chamber surrounded by a straight sidewall fabricated from a single material of construction, a cylindrical impeller hub eccentrically mounted within said chamber in tangential, substantially fluid-tight contact with said sidewall, said hub being provided with a diametrical slot, a pair of impeller vanes positioned in said slot in side by side, sliding contact, said vanes being yieldably biased outwardly into abutment with said sidewall, and an inlet port adjacent said tangential contact on one side thereof, the side wall of said inlet port adjacent said tangential contact being angularly spaced therefrom to mistime said pumping cycle and induce pulsations on only the inlet side of said pump, and an outlet port in said sidewall adjacent said tangential contact on the other side thereof, said outlet port being provided with a recessed cavity in said sidewall cooperating with and surrounding the opening in said outlet port, a portion of the marginal edge of said recessed cavity being immediately adjacent said tangential contact.

2. A non-variable rotary displacement pump for lubricating and industrial oil drainage units which comprises a pump casing having a substantially circular chamber surrounded by a straight sidewall fabricated from a single material of construction, a pair of opposed closure plates mounted in fluid-tight relationship on said sidewall to enclose said chamber, a cylindrical impeller hub eccentrically mounted within said chamber in tangential, substantially fluid-tight contact with said sidewall and journalled in said closures, said hub being provided with a diametrical slot, a pair of impeller vanes positioned in said slot in side by side sliding contact, said vanes being yieldably biased outwardly into abutment with said sidewall, and an inlet port adjacent said tangential contact on one side thereof, the side wall of said inlet port adjacent said tangential contact being angularly spaced therefrom to mistime said pumping cycle and induce pulsations on only the inlet side of said pump, and an outlet port in said sidewall adjacent said tangential contact on the other side thereof, said outlet port being provided with a recessed cavity in said sidewall cooperating with and surrounding the opening in said outlet port, a portion of the marginal edge of said recessed cavity being immediately adjacent said tangential contact.

3. A non-variable rotary displacement pump for lubricating and industrial oil drainage units which comprises a pump casing having a substantially circular chamber surrounded by a straight sidewall fabricated from a single material of construction, a pair of opposed closure plates mounted in fluid-tight relationship on said sidewall to enclose said chamber, a cylindrical impeller hub eccentrically mounted within said chamber in tangential substantially fluid-tight contact with said sidewall and journalled in said closures, said hub being provided with a diametrical slot, a pair of impeller vanes positioned in said slot in side by side sliding contact, said vanes being yieldably biased outwardly into abutment with said sidewall, and an inlet port adjacent said tangential contact on one side thereof, the side wall of said inlet port adjacent said tangential contact being angularly spaced therefrom to mistime said pumping cycle and induce pulsations on only the inlet side of said pump, an outlet port in said sidewall adjacent said tangential contact on the other side thereof, said outlet port being provided with a recessed cavity in said sidewall cooperating with and surrounding the opening in said outlet port a portion of the marginal edge of said recessed cavity being immediately adjacent said tangential contact; and a speed reduction drive means for said pump comprising a reduction pinion pump drive gear, coupling means connecting said impeller hub and said pinion gear, a prime mover, and gear means driven by said prime mover and cooperating with said pinion gear to effect its rotation at a slower speed than the speed of rotation of said prime mover.

4. A unitary drainage unit for lubricating oils and industrial oils which comprises a pump casing having a substantially circular chamber surrounded by a straight sidewall fabricated from a single material of construction, a pair of opposed closure plates mounted in fluid-tight relationship on said sidewall to enclose said chamber, an impeller hub eccentrically mounted within said chamber in tangential, substantially fluid-tight contact with said sidewall and journalled in said closures, said hub being provided with a diametrical slot, a pair of impeller vanes positioned in said slot in side by side sliding contact, said vanes being yieldably biased outwardly into abutment with said sidewall, and an inlet port adjacent said tangential contact on one side thereof, the side wall of said inlet port adjacent said tangential contact being angularly spaced therefrom to mistime said pumping cycle and induce pulsations on only the inlet side of said pump, and an outlet port in said sidewall adjacent said tangential contact on the other side thereof, said outlet port being provided with a recessed cavity in said sidewall cooperating with and surrounding the opening in said outlet port a portion of the marginal edge of said recessed cavity being immediately adjacent said tangential contact, bracket means depending from said pump casing; an electrical motor fastened to said pump means with the longitudinal axis of said motor being normal to the axis of rotation of said impeller hub; and a speed reduction drive means for said pump comprising a reduction pinion pump drive gear, coupling means connecting said impeller hub and said pinion gear, and a housing enclosing said pinion gear, a worm gear journalled in said housing and meshing with said pinion gear, and coupling means rotatably connecting said worm gear with said motor.

5. An oil sump drainage system which comprises an oil sump provided with a drainage outlet disposed adjacent the bottom thereof, a non-variable rotary displacement pump comprising a pump casing having a substantially circular chamber surrounded by a sidewall, an impeller hub eccentrically mounted within said chamber in tangential, substantially fluid-tight contact with said sidewall, said hub being provided with a diametrical slot, a pair of impeller vanes positioned in said slot in side by side sliding contact, said vanes being yieldably biased outwardly into abutment with said sidewall, and an inlet port adjacent said tangential contact on one side thereof, the side wall of said inlet port adjacent said tangential contact being angularly spaced therefrom to mistime said pumping cycle and induce pulsations on only the inlet side of said pump, and an outlet port in said sidewall adjacent said tangential contact on the other side thereof, said outlet port being provided with a recessed cavity in said sidewall cooperating with and surrounding the opening in said outlet port, a portion of the marginal edge of said recessed cavity being immediately adjacent said tangential contact, rigid conduit means interconnecting said drainage outlet and said inlet port, and conduit means connected to said outlet port for discharging oil from said sump.

6. An oil sump drainage system which comprises a sump provided with a drainage outlet disposed adjacent the bottom thereof, a non-variable rotary displacement pump comprising a pump casing having a substantially circular chamber surrounded by a sidewall, a pair of opposed closure plates mounted in fluid-tight relationship on said sidewall to enclose said chamber, an impeller hub eccentrically mounted within said chamber in tangential substantially fluid-tight contact with said sidewall and journalled in said closures, said hub being provided with a diametrical slot, a pair of impeller vanes positioned in said slot in side by side sliding contact, said vanes being yieldably biased outwardly into abutment with said sidewall, and an inlet port adjacent said tangential contact on one side thereof, the side wall of said inlet port adjacent said tangential contact being angularly spaced therefrom to mistime said pumping cycle and induce pulsations on only the inlet side of said pump, and an outlet port in said sidewall adjacent said tangential contact on the other side thereof, said outlet port being provided with a recessed cavity in said sidewall cooperating with and surrounding the opening in said outlet port, a portion of the marginal edge of said recessed cavity being immediately adjacent said tangential contact; rigid conduit means interconnecting said drainage outlet and said inlet port, and conduit means connected to said outlet port for discharging oil from said sump and a speed reduction drive means for said pump comprising a reduction pinion drive gear, coupling means connecting said impeller hub and said pinion gear, a prime mover, and gear means driven by said prime mover and cooperating with said pinion gear to effect its rotation at a slower speed than the speed of rotation of said prime mover.

7. An oil sump drainage system which comprises an oil sump provided with a drainage outlet disposed adjacent the bottom thereof, a non-variable rotary displacement pump which comprises a pump casing having a substantially circular chamber surrounded by a sidewall, a pair of opposed closure plates mounted in fluid-tight relationship on said sidewall to enclose said chamber, an impeller hub eccentrically mounted within said chamber in tangential, substantially fluid-tight contact with said sidewall and journalled in said closures, said hub being provided with a diametrical slot, a pair of impeller vanes positioned in said slot in side by side sliding contact, said vanes being yieldably based outwardly into abutment with said sidewall, and an inlet port adjacent said tangential contact on one side thereof, the side wall of said inlet port adjacent said tangential contact being angularly spaced therefrom to mistime said pumping cycle and induce pulsations on only the inlet side of said pump, and an outlet port in said sidewall adjacent said tangential contact on the other side thereof, said outlet port being provided with a recessed cavity in said sidewall cooperating with and surrounding the opening in said outlet port, a portion of the marginal edge of said recessed cavity being immediately adjacent said tangential contact, an electric motor for driving said pump, a source of electrical power for said motor, and electrical switch means for controlling the distribution of electrical power to said motor, a liquid level sensing means communicating with the interior of said sump, electrical relay means actuated by said liquid level sensing means, said electrical relay means being connected in series with an engine electrical circuit whereby said engine circuit is incapable of being energized at low liquid levels in said sump.

References Cited in the file of this patent

UNITED STATES PATENTS

| | | |
|---|---|---|
| 256,781 | Winkler | Apr. 18, 1882 |
| 1,329,895 | Frodsham | Feb. 3, 1920 |
| 1,339,723 | Smith | May 11, 1920 |
| 1,938,854 | Moulet | Dec. 12, 1933 |
| 1,960,389 | McFerran | May 29, 1934 |
| 2,250,271 | Morgan | July 22, 1941 |
| 2,260,312 | Gruman | Oct. 28, 1941 |
| 2,312,886 | Ellinwood | Mar. 2, 1943 |
| 2,367,326 | Beckman | Jan. 16, 1945 |
| 2,717,770 | Gibson et al. | Sept. 13, 1955 |

FOREIGN PATENTS

| | | |
|---|---|---|
| 703,047 | Great Britain | Jan. 27, 1954 |
| 1,072,018 | France | Mar. 10, 1954 |